(12) United States Patent
Acharya

(10) Patent No.: US 7,937,352 B2
(45) Date of Patent: May 3, 2011

(54) COMPUTER PROGRAM PRODUCT AND METHOD FOR FOLDER CLASSIFICATION BASED ON FOLDER CONTENT SIMILARITY AND DISSIMILARITY

(75) Inventor: Chiranjit Acharya, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/620,499

(22) Filed: Nov. 17, 2009

(65) Prior Publication Data

US 2010/0131509 A1 May 27, 2010

Related U.S. Application Data

(63) Continuation of application No. 11/457,107, filed on Jul. 12, 2006, now Pat. No. 7,630,946.

(51) Int. Cl.
*G06N 5/02* (2006.01)
*G06N 7/00* (2006.01)

(52) U.S. Cl. ................ 706/45; 706/46; 706/47

(58) Field of Classification Search ........................ None
See application file for complete search history.

(56) References Cited

U.S. PATENT DOCUMENTS

| 6,446,061 | B1 | 9/2002 | Doerre et al. | |
|---|---|---|---|---|
| 6,460,036 | B1 | 10/2002 | Herz | |
| 6,592,627 | B1 * | 7/2003 | Agrawal et al. | 715/234 |
| 6,886,007 | B2 | 4/2005 | Leymann et al. | |
| 2002/0042793 | A1 | 4/2002 | Choi | |
| 2003/0126561 | A1 | 7/2003 | Woehler et al. | |
| 2003/0177000 | A1 | 9/2003 | Mao et al. | |
| 2003/0217052 | A1 | 11/2003 | Rubenczyk et al. | |
| 2004/0111438 | A1 | 6/2004 | Chitrapura et al. | |
| 2005/0044487 | A1 | 2/2005 | Bellegarda et al. | |
| 2006/0004747 | A1 | 1/2006 | Weare | |
| 2006/0031217 | A1 | 2/2006 | Smith et al. | |
| 2006/0095521 | A1 | 5/2006 | Patinkin | |

OTHER PUBLICATIONS

Milano et al., D., "Using Ontologies for XML Data Cleaning", OTM Workshops, pp. 562-571, 2005.*
Conrad et al., J., "Effective Document Clustering for Large Heterogeneous Law Firm Collections", ICAIL '05, pp. 177-187, Jun. 6-11, 2005.*
Lee et al., J., "Hierarchical clustering based on ordinal consistency", Pattern Recognition 38, pp. 1913-1925, 2005.*
Lee et al., J., "Order Invariant Hierachical Clustering", IEEE SMC, pp. 1-6, 2002.*
*Examiner Interview Summary* from 11457064 mailed Dec. 30, 2009 (86626).
*Non-Final Office Action* from U.S. Appl. No. 11/457,064 mailed Dec. 30, 2009 (86626).
*Non-Final Office Action* from U.S. Appl. No. 11/457,090 mailed Dec. 22, 2009 (86627).

(Continued)

*Primary Examiner* — Michael B. Holmes
*Assistant Examiner* — Adrian L Kennedy
(74) *Attorney, Agent, or Firm* — Fitch, Even, Tabin & Flannery

(57) ABSTRACT

A computerized method of representing a dataset with a taxonomy includes obtaining a dataset containing a plurality of records; initializing a folder-set containing a plurality of folders; assigning labels to folders within the folder set; and classifying the plurality of records into the plurality of folders according to a predetermined entropic similarity condition.

20 Claims, 8 Drawing Sheets

OTHER PUBLICATIONS

Milano, et al., "Using Ontologies for XML Data Cleaning", *OTM Workshops*, 2005, pp. 562-571.

*Non Final Office Action* for U.S. Appl. No. 11/457,115 mailed Feb. 12, 2009 (86631).

Conrad, Jack G., et al., "Effective Document Clustering for Large Heterogeneous Law Firm Collections," Jun. 2005, pp. 177-187.

De Queiroz, Kevin et al., "Phylogeny as a Central Principle in Taxonomy: Phylogenetic Definition of Taxon Names", Systematic Zoology, vol. 39, Issue 4, Dec. 1990, pp. 307-322.

Dhar, Vassant et al., "Discovering Interesting Patterns for Investment Decision Making with GLOWER—A Genetic Learner Overlaid with Entropy Reduction", Data Mining and Knowledge Discovery, 4, Jan. 20, 2000, pp. 251-280.

*Non Final Office Action* from U.S. Appl. No. 11/457,090 mailed Feb. 10, 2009 (86627).

*Interview Summary* for U.S. Appl. No. 11/457,064 mailed May 4, 2009 (86626).

*Non Final Office Action* from U.S. Appl. No. 11/457,064 mailed Feb. 2, 2009 (86626).

*Non Final Office Action* from U.S. Appl. No. 11/457,095 mailed Feb. 9, 2009 (86628).

*Non Final Office Action* from U.S. Appl. No. 11/457,103 mailed Feb. 9, 2009 (86629).

*Non Final Office Action* from U.S. Appl. No. 11/457,107 mailed Feb. 9, 2009 (86630).

*Notice of Allowance* from U.S. Appl. No. 11/457,107 mailed Jul. 23, 2009(86630).

*Final Office Action* from U.S. Appl. No. 11/457,064 mailed Aug. 14, 2009 (86626).

*Notice of Allowance* for U.S. Appl. No. 11/457,095 mailed Aug. 13, 2009 (86628).

*Examiner Interview Summary* from U.S. Appl. No. 11/457,095 mailed Aug. 13, 2009 (86628).

*Final Office Action* from U.S. Appl. No. 11/457,103 mailed Aug. 19, 2009 (86629.

*Final Office Action* for U.S. Appl. No. U.S. Appl. No. 11/457,090 mailed Aug. 19, 2009 (86627).

Lee, John W., et al., "Hierarchical Clustering Based on Ordinal Consistency", *Department of Computing, Hong Kong Polytechnic University*, Hung Hom, Kowloon, Hong Kong. Received Sep. 2, 2004, accepted May 16, 2005, *Pattern Recognition* 38 (2005) 1913-1925.

Lee, John W., "Order Invariant Hierarchical Clustering", *Department of Computing, Hong Kong Polytechnic University, Department of Rehabilitation, Sciences, Hong Kong Polytechnic University*, Hung Hom, Hong Kong, China, 2002 IEEE, 6 pgs.

*Notice of Allowance* from U.S. Appl. No. 11/457,115 mailed Aug. 25, 2009 (86631).

Acharya, et al. U.S. Appl. No. 11/436,142, filed May 16, 2006.
Acharya, et al. U.S. Appl. No. 11/457,090, filed Jul. 12, 2006.
Acharya, et al. U.S. Appl. No. 11/457,095, filed Jul. 12, 2006.
Acharya, et al. U.S. Appl. No. 11/457,103, filed Jul. 12, 2006.
Acharya, et al. U.S. Appl. No. 11/457,107, filed Jul. 12, 2006.
Acharya, et al. U.S. Appl. No. 11/457,115, filed Jul. 12, 2006.
Acharya, et al. U.S. Appl. No. 11/457,064, filed Jul. 12, 2006.

*Examiner Interview Summary* from U.S. Appl. No. 11/457,090 mailed Mar. 12, 2010 (86627).

*Notice of Allowance* from U.S. Appl. No. 11/457,103 mailed Mar. 8, 2010 (86629).

*Examiner Interview Summary* from U.S. Appl. No. 11/457,090 mailed Jul. 26, 2010 (88627).

*Final Office Action* from U.S. Appl. No. 11/457,064 mailed Jul. 23, 2010 (86626).

*Notice of Allowance* from U.S. Appl. No. 11/457,090 mailed Jul. 26, 2010 (86627).

Ding, et al., "Ontology Research and Development Part 1—A Review of Ontology Generation", *Journal of Information Science*, 2002, 1-23.

Uschold, et al., "Ontology Reuse and Application", *FOIS '98*, 1998, 1-15.

Wiesman, et al., "Automatic Ontology Mapping for Agent Communication", *AAMAS '02*, Jul. 15-19, 2002, 563-564.

\* cited by examiner

| | |
|---|---|
| 402a | 8498618 |
| 402b | 0TopOntology-Company-BroadcastStation-TVTokyo |
| 402c | 0TopOntology-0Region-Asia-Japan |
| 402d | Best, Underway, Sports, GolfCategory, Golf, Art, 0SubCulture, Animation, Family, FamilyGeneration, Child, Kids, Family, FamilyGeneration, Child |
| ... | *** |
| 402n | Kids, Cartoon |
| ... | *** |
| ... | *** |
| ... | *** |
| ... | 20040410 |
| ... | 0930 |
| ... | 1000 |
| 402x | 30 |

404 points to 8498618; 400 labels the whole record; 402 brackets all rows.

FIG. 4

COMPUTER PROGRAM PRODUCT AND METHOD FOR FOLDER CLASSIFICATION BASED ON FOLDER CONTENT SIMILARITY AND DISSIMILARITY

CROSS-REFERENCE TO RELATED APPLICATION(S)

This document is a continuation application that is related to, and claims priority through U.S. patent application Ser. No. 11/457,107, also entitled "System for Folder Classification Based on Folder Content Similarity and Dissimilarity," and filed on Jul. 12, 2006 now U.S. Pat. No. 7,630,946, that is, in turn, related to, and claims priority from, U.S. patent application Ser. No. 11/436,142, entitled "Clustering and Categorization of Category Data," and filed on May 16, 2006, all of which are commonly owned, and which are hereby incorporated by this reference in their entirety.

TECHNICAL FIELD

Embodiments of the present invention generally technically relate to methods and systems that are adapted to classify data. More specifically, embodiments of the present invention technically relate to folder-based methods and systems that are adapted to classify data.

BACKGROUND ART

Electronic records, e.g., emails, documents, videos, photographs, music, etc., are typically stored on a computer system and organized by a classifier that defines decision boundaries to separate records from each other within the computer system. Folder-based classification allows a user to build a classifier by creating a folder set, wherein each folder within the folder set is instantiated by a number of exemplary records based on some arbitrary similarity, i.e., distance, between the records. The folder set as a whole acts as the classifier, wherein new records are compared against the user-created folder set and can be automatically sorted into the most appropriate folder. If the distance between a record and the folders is more than a threshold value, then the record is sorted into a default folder.

While conventional folder-based classifiers are generally useful record management tools, a considerable amount of time and effort must be invested by the user to initialize and continually maintain the classifier. For example, folder sets of many conventional folder-based classifiers must be manually added to, or deleted from, a folder set; and the contents thereof must be manually modified to reflect the user's evolving needs.

Accordingly, a system and method for implementing a folder-based classifier that automatically creates a folder set, that automatically adds folders to, and deletes folders from, the to folder set, and that automatically modifies the contents of existing folders based on user feedback would be beneficial.

BRIEF SUMMARY OF THE INVENTION

Several embodiments disclosed herein advantageously address the needs above as well as other needs by providing a system and method for implementing a folder-based classifier. One embodiment describes a computerized method of representing a dataset with a taxonomy. First, a dataset containing a plurality of records is obtained. Next, a folder-set containing a plurality of folders is initialized. Labels are then assigned to folders within the folder set. Finally, the plurality of records are classified into the plurality of folders according to a predetermined entropic similarity condition.

Another embodiment describes a computer program product including a computer usable medium having computer readable code embodied therein for causing a computer to effect obtaining a dataset containing a plurality of records. The computer readable code is also adapted to cause the computer to initialize a folder-set containing a plurality of folders. Further, the computer readable code is adapted to assign labels to folders within the folder set and classify the plurality of records into the plurality of folders according to a predetermined entropic similarity condition.

By implementing the embodiments exemplarily described above, a folder-based classifier can be provided that is adapted to automatically create a collection of folders based on exemplars provided by the user, or based on existing folders, or based on existing classifications of records, or a combination thereof, automatically add and delete folders to or from the collection, automatically modify the contents of other folders not in the collection, and modify the contents of folders based on user feed-back.

BRIEF DESCRIPTION OF THE DRAWING(S)

The above, and other, aspects, features, and advantages of several embodiments exemplarily described herein will be more apparent from the following more particular description thereof, presented in conjunction with the following drawings.

FIG. 4 is a schematic diagram, illustrating an exemplary ontology onto which records containing categorical data are mapped, in accordance with embodiments of the present invention.

Figure 1:
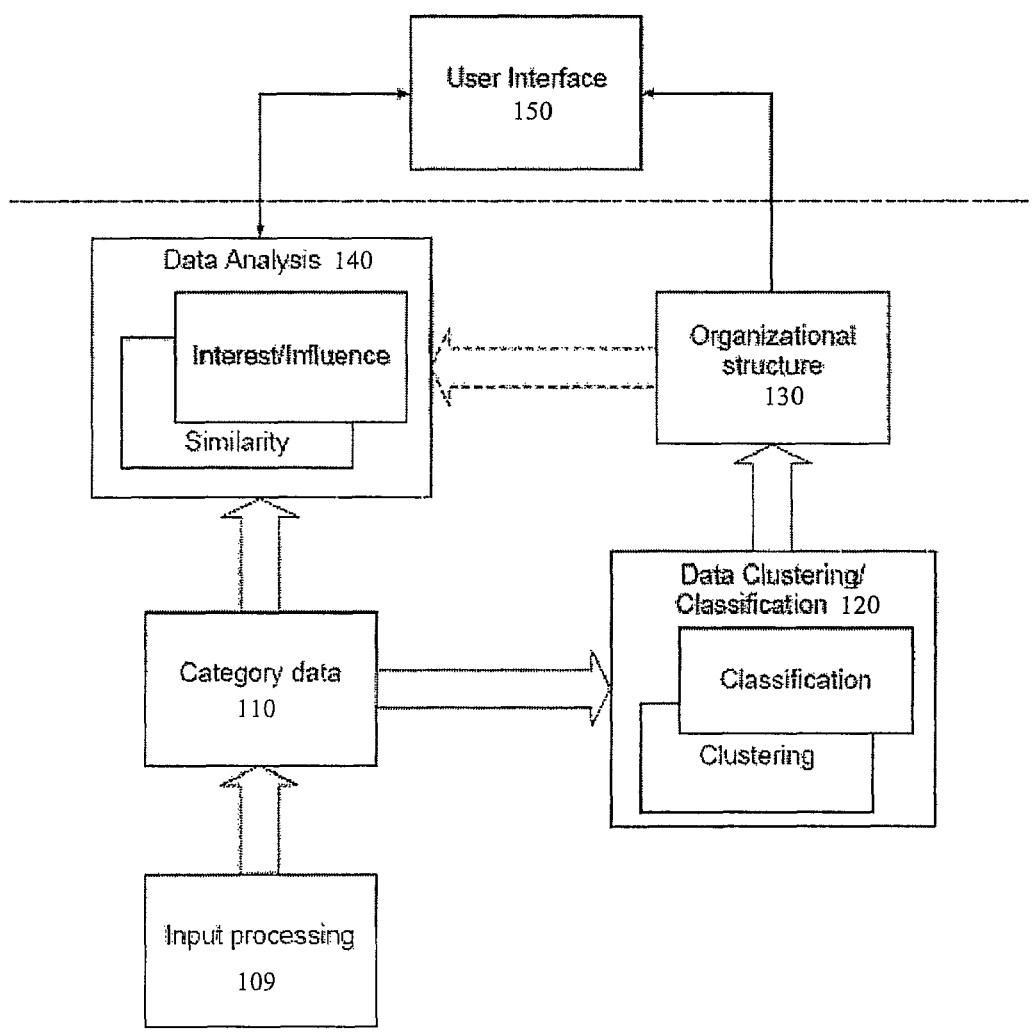
FIG. 1 is a schematic diagram, illustrating a system for assisting a user in searching and automatically organizing information, in accordance with embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

MODE(S) OF CARRYING-OUT THE INVENTION

The following description is not to be taken in a limiting sense, but is made merely for the purpose of describing the general principles of exemplary embodiments. Understood is that other embodiments may be utilized and that logical, mechanical, electrical, and other changes may be made without departing from the spirit or scope of the numerous disclosed embodiments of the present invention. The scope of the numerous disclosed embodiments of the present invention should be determined with reference to the herein appended claims.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated and/or transformed.

It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be appreciated that more or fewer processes may be incorporated into the methods illustrated in the flow diagrams discussed below without departing from the scope of the numerous disclosed embodiments of the present invention. Describing the methods by reference to a flow diagram enables one skilled in the art to develop such programs including such instructions to carry out the methods on suitably configured hardware platforms and operating environments. The computer-executable instructions may be written in a computer programming language or may be embodied in firmware logic. If written in a programming language conforming to a recognized standard, such instructions can be executed on a variety of hardware platforms and operating environments and for interface to a variety of operating systems. In addition, embodiments of the present invention are not described with reference to any particular programming language. It will be appreciated that a variety of programming languages may be used to implement the teachings of the disclosed embodiments.

FIG. 1 illustrates a diagram of a system 100 for assisting a user in searching and automatically organizing information, such as content, which can be characterized by categorical data 110, in accordance with embodiments of the present invention. Such content may be, for example, recorded TV programs, electronic program guide (EPG) entries, and multimedia content. The system 100 may further assist the user in tracking preferences of the user, and may also provide recommendations to the user. The system 100 can further be used by the user to search by example and/or by query.

As shown in FIG. 1, the system 100 includes an input processing module 109, a clustering/classification module 120, a data analysis module 140, and a user interface 150. Also shown in FIG. 1 are categorical data 110 and an organizational structure 130. Categorical data describes multiple attributes or categories. Often the categories are discrete and lack a natural similarity measure between them. The input processing module 109 pre-processes input data into categorical data and load the categorical data 110.

The categorical data 110 is grouped into clusters, and/or classified into folders by the clustering/classification module 120. The category and classification methods described herein can operate on any arbitrary categorical dataset. Generally, clustering of categorical data 110 is the process of identifying a set of underlying patterns in categorical data points within a data set and grouping the data points into one or more groups or clusters based on some measure of similarity. The knowledge of category distribution obtained in the process of clustering is used to construct a classifier for some data spaces. Classification is the task of assigning data points to one or more of the identified categories based on some predefined proximity or divergence measure.

According to numerous embodiments described herein, the clustering/classification module 120 uses a folder-based classification system. The folder-based classification system allows a user to build a classifier by creating a group of folders. Each folder within the group is instantiated by a number of exemplary categorical data records.

In one embodiment, one or more of the exemplary records may be input by the user. Accordingly, a group of folders created by the user may act as a classifier such that new categorical data records are compared against the user-created group of folders and automatically sorted into the most appropriate folder. The folder-based classifier automatically creates a collection of folders based on exemplars provided by the user, or based on existing folders, or based on existing classifications of records, or a combination thereof. The folder-based classifier can also automatically add and delete folders to or from the collection, automatically modify the contents of other folders not in the collection, and modify the contents of folders based on user feed-back.

The output of the clustering/classification module 120 is an organizational data structure 130, such as a dendrogram, a cluster tree, or a matrix, collectively referred to herein as a taxonomy. A cluster tree may be used as an indexed organization of the categorical data or to select a suitable cluster of the data.

Many clustering applications require identification of a specific layer within a cluster tree that best describes the underlying distribution of patterns within the categorical data. In one embodiment, an output of the clustering/classification module 120 includes an optimal layer that contains a unique cluster group containing an optimal number of clusters.

A data analysis module 140 may use the folder-based classifiers and/or classifiers generated by clustering operations for automatic recommendation or selection of content. The data analysis module 140 may automatically recommend or provide content that may be of interest to a user or may be similar or related to content selected by a user. In one embodiment, the data analysis module 140 assigns categorical data records for new content items with the appropriate folders based on similarity.

A user interface 150 also shown in FIG. 1 is designed to assist the user in searching and automatically organizing content using the system 100. Although shown in FIG. 1 as specific separate modules, the clustering/classification module 120, organizational data structure 130, and the data analysis module 140 may be implemented as different separate modules or may be combined into one or more modules.

Figures 2, 3:
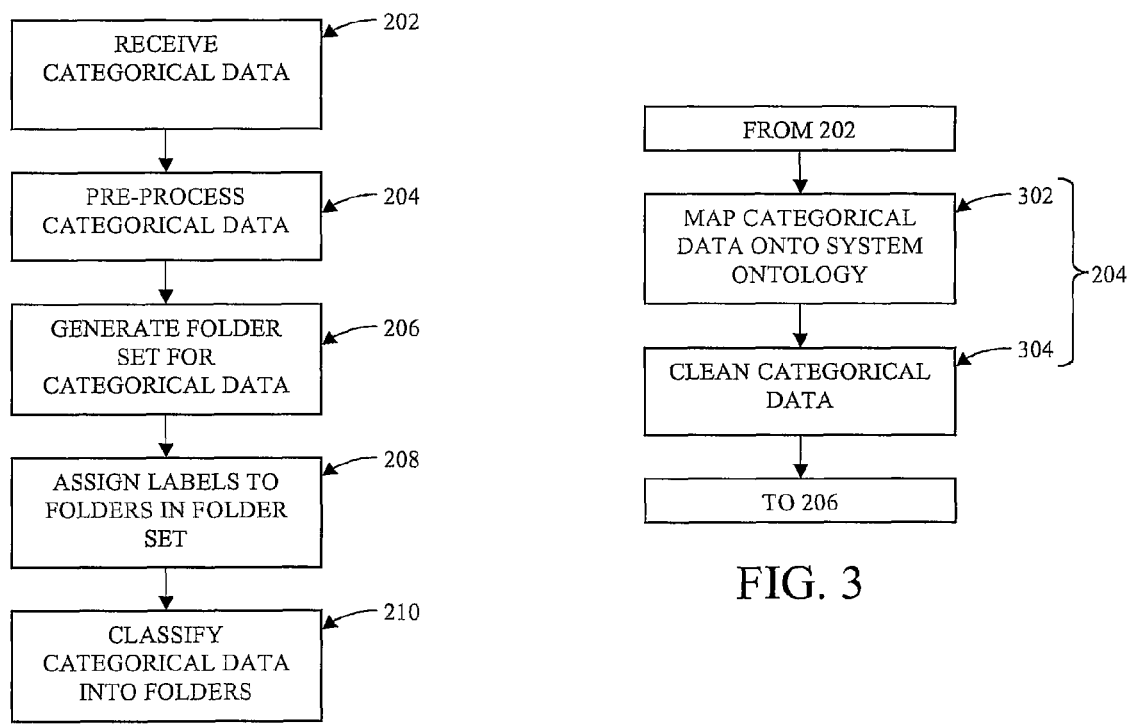
FIG. 2 is a schematic diagram, illustrating an exemplary process of classifying categorical data, in accordance with embodiments of the present invention.
FIG. 3 is a schematic diagram, illustrating an exemplary pre-processing method as applied to categorical data, in accordance with embodiments of the present invention.

FIG. 2 illustrates an exemplary process of classifying categorical data in accordance with embodiments of the present invention. Referring to FIG. 2, an exemplary process flow of classifying categorical data proceeds as follows: receive input data (202), pre-process the received input data into the aforementioned categorical data (204), generate a folder set for the categorical data (206), assign category labels for the generated folder set (208), and classify the categorical data into the folders (210). In one embodiment, the input data received at 202 includes a plurality of records electronically input into the system 100. As used herein, a record can be a document, a video, photograph, music, or the like, or any combination thereof.

An exemplary process flow of pre-processing the dataset at 204 is discussed below with respect to FIG. 3. Referring to FIG. 3, each record is mapped onto a system ontology (302) and the dataset formed from the received records is "cleaned" (304). In one embodiment, records within the received dataset can be mapped onto predetermined fields of a system ontology at 302. The format of the data, the transformations expected, and the format of the output data are specified in a language designed to describe metadata such as RDF. RDF employs a graph-based data model with a well-defined entailment relation. RDF is expressed in an XML format, the syntax of which explicitly specifies the parameters required and simplifies specification of the transformation process.

FIG. 4 illustrates an exemplary ontology onto which records containing categorical data are mapped in accordance with embodiments of the present invention. As shown in FIG. 4, the ontology 400 is characterized by a plurality of attributes 402, i.e., 402a to 402x, wherein each attribute is further characterized by one or more terms 404. In one embodiment, the predetermined ontology adds abstract terms to particular attributes of a record to facilitate processing of the electronic record by the system 100. The ontology thus provides a means for uniformly representing records in a manner that the system 100 can recognize efficiently.

As shown in FIG. 4, a received record can be a document describing a particular television program. Data mapped into a first attribute 402a (i.e., an "identification attribute") corresponds to record identifier, e.g., a particular television program, and is characterized by the term "8498618;" data mapped into another attribute 402d, i.e., a "descriptor attribute," corresponds to keywords for the television program identified in attribute 402a and is characterized by the terms listed from "Best" to "Child;" data mapped into attribute 402n, i.e., a "genre attribute," corresponds to the genre for the television program identified in attribute 402a and is characterized by the terms "Kids" and "Cartoon;" data mapped into other attributes correspond to the date, start time, end time, duration, of the television program identified in attribute 402a and are characterized by the terms "20040410," "0930," "1000," and "30," respectively. In one embodiment, the term "***" represents missing data. In another embodiment, the same term can appear multiple times within the same attribute, e.g., the keyword attribute 402d contains multiple instances of the term "Family." In the illustrated embodiment, terms such as "0SubCulture" are abstract terms supplemented by the ontology.

Records are represented within the system as vectors. The dimension of each vector corresponds to the total number of terms characterizing all attributes found in all records processed by the system, i.e., the global vocabulary of the system. Values assigned to components of a vector represent the presence of a term within a corresponding record. For example, a vector component can be binarily represented as either a 0 (indicating the absence of a term from a record) or a 1 (indicating the presence of a term in a record).

For example, suppose that the vocabulary for the entire collection of records and attributes, i.e., the global vocabulary, consists of only six terms: A, B, C, D, E, and F. Let a first record $d_1$ include the terms A, B, D, and E and a second record $d_2$ include the terms C, D, and F. Accordingly, the first record $d_1$ can be binarily represented by a six-dimensional vector $d_1=\{1, 1, 0, 1, 1, 0\}$ and the second record $d_2$ can be binarily represented by a six-dimensional vector $d_2=\{0, 0, 1, 1, 0, 1\}$. As shown above, the global vocabulary consists of only six terms. In practice, however, the global vocabulary includes thousands of terms, wherein any particular record includes only a relatively small number of terms. Accordingly, only a relatively few number of vector components are assigned non-zero values. In practice, therefore, records are typically represented as highly "sparse" vectors that can be difficult to process to efficiently generate folder sets and yield inaccurate results. To increase the efficiency with which folder sets are generated, and to produce more accurate results, each record is "cleaned" at 304.

In other embodiments, vector components can be numerically represented (as opposed to binarily represented) by a value corresponding to the number of times that a term occurs in a record, i.e., the frequency of the term in the record, or by a normalized value corresponding to the number of times that a term occurs in a record in addition to the total number of terms the record contains, i.e., the normalized frequency of the term in the record. An exemplary process flow of performing the cleaning at 304 is discussed below with respect to FIG. 5.

Figure 5:
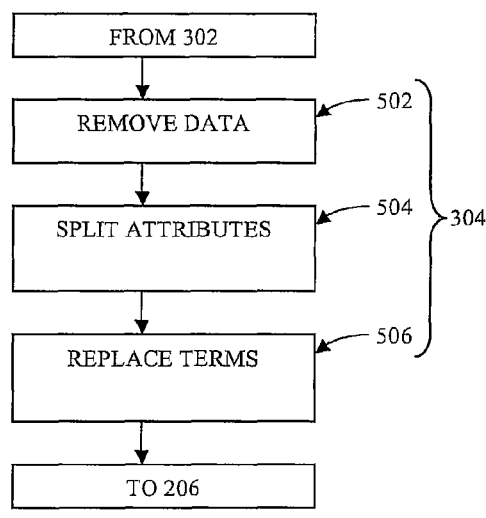
FIG. 5 is a schematic diagram, illustrating an exemplary process of cleaning categorical data, in accordance with embodiments of the present invention.

Referring to FIG. 5, categorical data can be cleaned, for example, by removing terms (502), splitting attributes (504), and replacing terms (506). In one embodiment, terms can be removed by removing terms from attributes that are not generally useful in generating a folder set or in classifying records based on the generated folder set. Non-useful terms can be identified as those that occur infrequently, e.g., once, within a particular attribute of a record. By removing terms from each record, the total number of terms within the attribute vocabulary can be significantly reduced. For example, suppose the system receives 2154 records describing television programs playing over the course of a week. Such a collection of records may include 3016 description keywords, wherein each record contains an average of 5.37 keywords, wherein each keyword occurs an average of 4.29 times, and wherein 1113 keywords occur just once. By removing the keywords occurring just once, the size of the description keyword attribute space can be reduced by about 33%.

In one embodiment, the attributes are split by splitting large record attributes, i.e., attributes characterized by a large number of unique terms, into a plurality of smaller sub-attributes characterized by a smaller number of unique terms. By splitting a large record attribute into small sub-attributes, probabilities can be normalized over smaller, less sparse domains and yield more accurate results. Further, each sub-attribute can be weighted to reflect its relative importance within the record.

In one embodiment, a large attribute can be split into a plurality of smaller sub-attributes by grouping terms within the large attribute based on their frequency of occurrence within the large attribute. In this case, it is assumed that terms occurring more frequently are more relevant, and thus more important, than terms occurring less frequently). As a result, information indicating relevance levels of particular sub-attributes is imparted and used as a weighting value to reflect the relative importance of each sub-attribute. The size and number of the sub-attributes created as a result of the splitting can be controlled, for example, by specifying the proportions of frequencies or value of frequencies desired in each sub-attribute.

In another embodiment, a large attribute can be split into a plurality of sub-attributes by grouping semantically-related terms. In this case, meanings of words may be internally generated or obtained from a lexical reference system such as WordNet, a lexical reference system developed at the Cognitive Science Laboratory at Princeton University. As a result, information indicating a certain degree of "common-sense" is imparted and used as a weighting value to reflect the relevance of each sub-attribute. The size and number of the sub-attributes created as a result of the splitting can be controlled using statistics about particular terms and term frequencies in the attribute. In one embodiment, the total number of occurrences of terms within each sub-attribute can be maintained within a predetermined range to control the degree of relatedness between terms in a particular sub-attribute or to control the abstractness of relationships between terms within a sub-attribute.

In one embodiment, terms that can be grouped together into a sub-attribute according to their semantic interrelatedness are identified using an "is-a" (hypernym) chain relation as applied to nouns. Consider, for example, the following hypernym chains:
1. cat, feline, carnivore, placental, mammal, vertebrate, chordate, animal, organism, living thing, object, entity;
2. dog, canine, carnivore, placental, mammal, vertebrate, chordate, animal, organism, living thing, object, entity; and
3. umbrella, canopy, shelter, protective covering, covering, artifact, object, entity.

Based on the first hypernym chain, a cat is a feline, a feline is a carnivore, etc. Based on the second hypernym chain, a dog is a canine, a canine is a carnivore, etc. Based on the third hypernym chain, an umbrella is a canopy, a canopy is a shelter, etc. As shown, the terms "cat" and "dog" share the "carnivore" hypernym relation much earlier in the chain than they share the 'object' hypernym relation with the term "umbrella". Accordingly, the term "cat" is more semantically related to the term "dog" than it is related to the term "umbrella." As a result, a large attribute containing the terms "cat," "dog," and "umbrella" will be split into a first sub-attribute containing the terms "cat" and "dog" and a second sub-attribute containing the term "umbrella." As will be appreciated, semantic relationships between terms changes as the structural taxonomy of the lexical reference system changes or as classes are inserted into or removed from a particular relation path. It will be appreciated, however, that terms other than the nouns appearing in WordNet can be grouped in a separate attribute space and downweighted if necessary.

In the example provided above, where the received records identify television programs, one large attribute may, for example, be divided into two smaller sub-attributes, wherein the first sub-attribute, related to recreation, contains the terms "Recreation," "Pachinko," "Hobby," "Fun," "Entertainment," "Encore," "Swimming," "Skating," "Gymnastics," "Hunting," "Fishing," "Tennis," "Basketball," "Golf," "Soccer," "Baseball," and "Athletics" while the second sub-attribute, related to food, contains the terms "Tofu," "Food," "Diet," "Vitamin," "Sushi," "Soup," "Pudding," "Dessert," "Chocolate," and "Beverage." In one embodiment, each of the terms identified above can be further divided into smaller sub-attributes according to a semantic relatedness between the terms.

In one embodiment, terms can be replaced by replacing specific terms with equivalent, more abstract terms. In this case, terms found, for example, in WordNet can be replaced with equivalent, more abstract terms. As a result, the number of unique terms characterizing an attribute of a record can be reduced because several specific terms can be mapped onto the same abstract term. Moreover, vector representations of records become much less sparse because each abstract term appears in more records and there are proportionately more abstract terms appearing in each record. The size and number of the sub-attributes created as a result of the term replacements can be controlled using statistics about particular terms and term frequencies in the attribute.

In the example provided above, where the received records identify television programs, the specific terms "Brother," "Sister," "Grandchild," "Baby," "Infant," "Son," "Daughter," "Husband," "Mother," "Parent," and "Father" of an attribute can all be mapped onto an equivalent abstract term "relative." Similarly, the specific terms "Hunting," "Fishing," "Gymnastics," "Basketball," "Tennis," "Golf," "Soccer," "Football," and "Baseball" of an attribute can all be mapped onto an equivalent abstract term "sport."

By cleaning each record as exemplarily described above with respect to FIG. 5, the total number of terms to be processed by the system 100 and/or the sparsity of vectors that represent records can be reduced. As a result, the efficiency with which folder sets are ultimately generated by the system 100, and the accuracy of results ultimately yielded may be increased. In one embodiment, the dataset D produced as a result of the pre-processing at 204 contains m records $d_1$, $d_2, \ldots, d_m$ and is characterized by an attribute space containing d attributes, $A_1, A_2, \ldots, A_d$. A generic attribute space $A_i$, where $i=1, \ldots, d$, can be characterized by any combination of $n_i$ unique terms contained within a vocabulary $V_i = \{v_i^1, v_i^2, \ldots, v_i^{n_i}\}$ specific to $A_i$. Accordingly, a global vocabulary V contains n unique terms characterizing the global attribute space A (i.e., a combination of all attributes within the dataset D), such that $$n = \sum_{i=1}^{d} n_i.$$

The dataset D can be represented as an m×n matrix. Accordingly, each row of the m×n matrix corresponds to a vector-space representation of a particular record.

Figure 6:
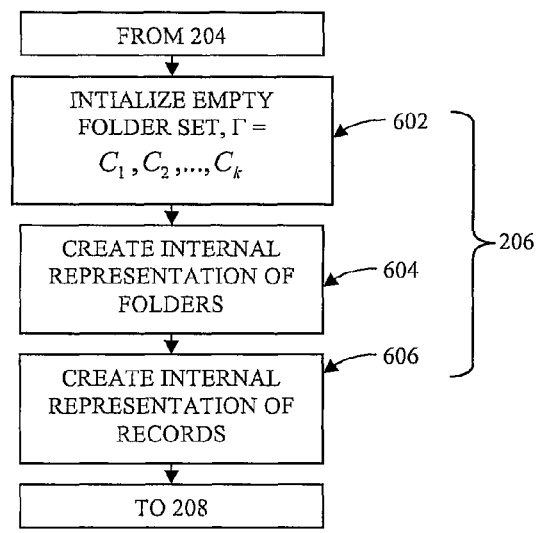
FIG. 6 is a schematic diagram, illustrating an exemplary process of generating a folder-based classifier, in accordance with embodiments of the present invention.

Once the categorical data has been pre-processed, a folder set can be created at 206. In one embodiment, the folder set can be created according to a process exemplarily described below with respect to FIG. 6. Referring to FIG. 6, a folder set Γ can be generated, for example, by initializing an empty folder set containing k folders $C_1, C_2, \ldots, C_k$ (602), creating an internal representation of the folders (604), and creating an internal representation of the records (606). In one embodiment, the folder set Γ is manually initialized at 602, wherein the user explicitly defines the folders within the folder set Γ by any suitable method.

In another embodiment, the folder set Γ is automatically initialized using a pool of user-defined exemplars according to the process exemplarily described below with respect to FIG. 7. In one embodiment, and as similarly discussed with respect to vector-space representations of records as a result of the pre-processing at 204, each exemplar can be represented as a record classified into a folder. In another embodiment, an exemplar can be represented as a record that has been previously classified.

Figure 7:
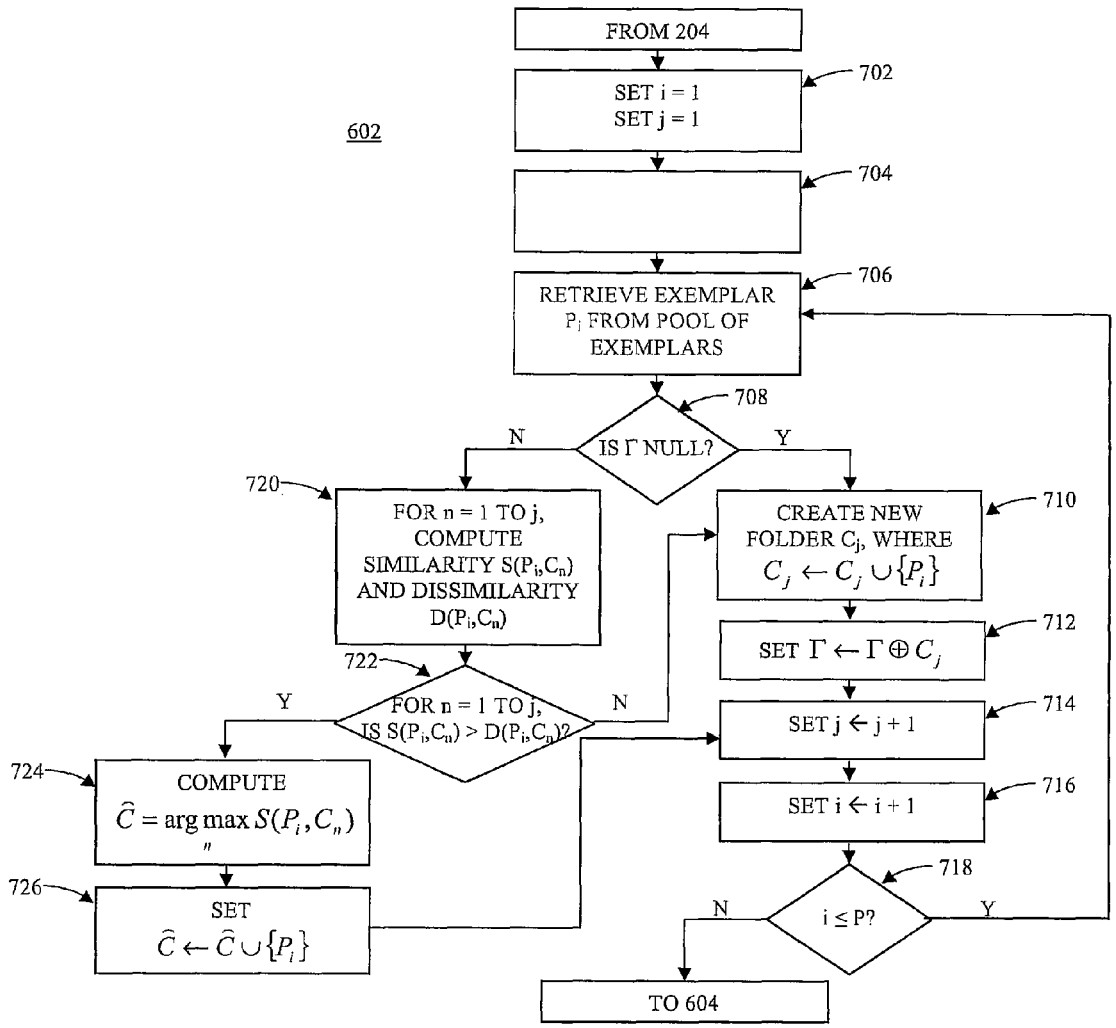
FIG. 7 is a schematic diagram, illustrating an exemplary process of initializing an empty folder set for use in connection with the process, as shown in FIG. 6.

Referring to FIG. 7, the folder set Γ is automatically initialized at 602 by, for example, setting exemplar and folder counter variables, i and j, respectively, to 1 (702), initializing an empty folder set Γ (704), retrieving the $i^{th}$ exemplar $P_i$ (0<i≦P) from a pool of user-defined exemplars (706), and determining whether the folder set Γ contains any folders (708).

If, as a result of 708 it is determined that the folder set Γ does not contain any folders, then a new folder $C_j$, containing the $i^{th}$ exemplar $P_i$, is created (710), the $j^{th}$ folder $C_i$ is mapped into the folder set Γ (712), the folder counter variable j is incremented by one (714), the exemplar counter variable i is incremented by one (716), and, at 716, it is determined whether the incremented exemplar counter variable i exceeds the number of exemplars in the pool of user-defined exemplars. In one embodiment, the $j^{th}$ folder $C_j$ created at 710 can be identified as the vector representing the $i^{th}$ exemplar $P_i$. In this case, the vector-space representation of the $i^{th}$ exemplar $P_i$ represents the centroid of the $j^{th}$ folder $C_j$. Accordingly, the centroid of each folder within the folder set Γ remains fixed.

If, as a result of 716, it is determined that the incremented exemplar counter variable i does not exceed the number of exemplars in the pool of user-defined exemplars, then the process flow is directed back to 706. Otherwise, the process flow proceeds from 716 to aforementioned 604.

If, as a result of 708, it is determined that the folder set Γ is not empty (e.g., because the folder set Γ contains j folders $C_1, \ldots C_j$), then the process flow continues to 720 where the similarity and the dissimilarity between the $i^{th}$ exemplar $P_i$ and each folder n within the folder set Γ are calculated and, subsequently, to 722 where it is determined whether the similarity between the $i^{th}$ exemplar $P_i$ and any folder within the folder set Γ is greater than the dissimilarity thereof Similarity and dissimilarity can be calculated in one of two methods: entropic method and the Tanimoto method.

According to the Tanimoto method, the records are represented as underlying vectors, as described above, and each folder can be represented as a vector corresponding to the centroid of all the records it contains. Using the Tanimoto method, absolute similarity between a record and a folder can be obtained by considering only the non-zero (or non-null) values of the vectors representing the records (e.g., record A) and folders (e.g., folder B) and determining the intersection of A and B (i.e., A∩B) The absolute dissimilarity can be obtained as follows: (A∪B)−(A∩B). In an alternative method, the relative similarity can be computed as follows: A∩B/A∪B and the dissimilarity can be computed as follows: (A∪B)−(A∩B)/(A∪B).

In one embodiment, the similarity (and therefore, the dissimilarity) between a folder and a record can be quantified by computing the distance between a vector resultant from the aforementioned process and computing the distance between the centroid of the folder and a vector representing some fixed query point or by computing the distance between each record in folder from the fixed query point and determining the average of the computed distances.

According to the entropic method, the similarity (or dissimilarity) can be quantified by determining the divergence value (as discussed in greater detail below) between the query point and the centroid of the folder. If, as a result of 722, it is determined that the similarity between the $i^{th}$ exemplar $P_i$ and a folder within the folder set Γ is less than the dissimilarity thereof, then the process flow proceeds to 710. If, as a result of 722, it is determined that the similarity between the $i^{th}$ exemplar $P_i$ and a folder within the folder set Γ is greater than the dissimilarity thereof, then the process flow proceeds to 724 where a folder Ĉ within the folder set Γ is identified to be most similar to the $i^{th}$ exemplar $P_i$. The $i^{th}$ exemplar $P_i$ is then merged into the identified folder Ĉ (726) and the process flow continues to 714.

Referring back to FIG. 6, after creating the folder set Γ at 602, an internal representation of the folders $C_1, C_2, \ldots, C_k$ is created at 604 and an internal representation of each record $d_1, d_2, \ldots, d_m$ is created at 606. In one embodiment, a generic cluster $C_i \in \Gamma$ can be internally represented by its conditional probability distribution $P(A/C_i)$ where $P(A=v_j|C_i)$ is the normalized probability of occurrence of the term $v_j$ in the cluster $C_i$. Similarly, a generic record $d_i \in D$ can be internally represented by its conditional probability distribution $P(A|d_i)$, where $P(A=v_j|d_i)$ is the normalized probability of occurrence of the term $v_j$ in $d_i$. The internal representation scheme described above is herein referred to as globally normalized (i.e. g-norm) representation because the term-frequency vectors of all records and folders are normalized across the global attribute space A to generate the probability mass function representation.

In another embodiment, each generic record $d_i \in D$ or cluster $C_i \in \Gamma$ can be internally represented as a set of d probability mass functions, one for each attribute $A_1, A_2, \ldots, A_d$. Accordingly, the internal representation of every record $d_i \in D$ is the disjunction of d locally normalized conditional probability distributions, $\{P(A_1|d_i) \wedge P(A_2|d_i) \wedge \ldots \wedge P(A_d|d_i)\}$ and the internal representation of every cluster $C_j \in \Gamma$ is the disjunction of d locally normalized conditional probability distributions, $\{P(A_1|C_1) \wedge P(A_2|C_2) \wedge \ldots \wedge P(A_d|C_k)\}$. The internal representation scheme described above is herein referred to as locally normalized (i.e., 1-norm) representation.

Compared to g-norm, 1-norm representation provides d degrees of freedom, as there are d entropy/information components corresponding to d probability distributions. The entropy/information components can be linearly combined in any manner, and therefore any type of clustering can be obtained varying the weight distribution across attributes. Moreover, g-norm representation propagates the effect of sparsity within one attribute to all other attributes whereas 1-norm representation confines attribute-local sparsities to the same local attribute space.

Figure 8:
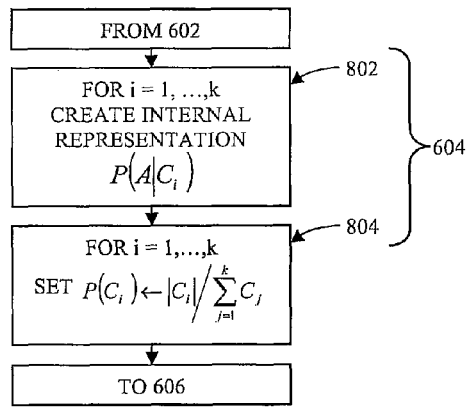
FIG. 8 is a schematic diagram, illustrating an exemplary process of creating an internal representation of folders for use in connection with the process, as shown in FIG. 6.

Therefore, and as shown in FIG. 8, internal representations of each folder $C_1, C_2, \ldots, C_k$ can be created by determining the conditional probability distribution $P(A|C_i)$ of each folder $C_i$ (for all $i=1, \ldots, k$) (802), and setting the marginal probability $P(C_i)$ of each folder $C_i$ (for all $i=1, \ldots, k$) equal to $$P(C_i) \leftarrow |C_i| \Big/ \sum_{j=1}^{k} C_j$$

Figure 9:
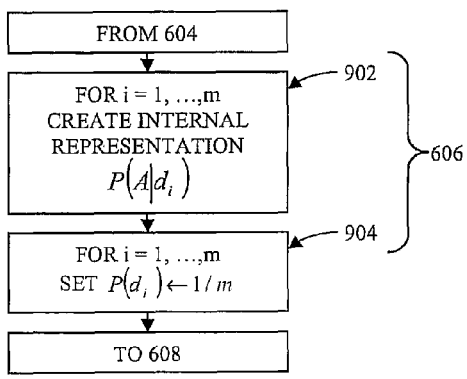
FIG. 9 is a schematic diagram, illustrating an exemplary process of creating an internal representation of records for use in connection with the process, as shown in FIG. 6.

(804). Further, and as shown in FIG. 9, internal representations of each record $d_1, d_2, \ldots, d_m$ can be created by determining the conditional probability distribution $P(A|d_i)$ of each record $d_i$ (for all $i=1, \ldots, m$) (902), and setting the marginal probability $P(d_i)$ of each folder $d_i$ (for all $i=1, \ldots, m$) equal to $1/m$ (904).

Referring back to FIG. 2, once the folder set $\Gamma$ is created at 206, category labels can be assigned to each folder at 208. In one embodiment, each category label is descriptive of the contents of the folder it is assigned to and can be assigned manually and/or automatically by the system by any known means. In another embodiment, the category label for each folder corresponds to the centroid of that folder. After labels are assigned to the folders at 208, records within the dataset D can be classified at 210.

Figure 10:
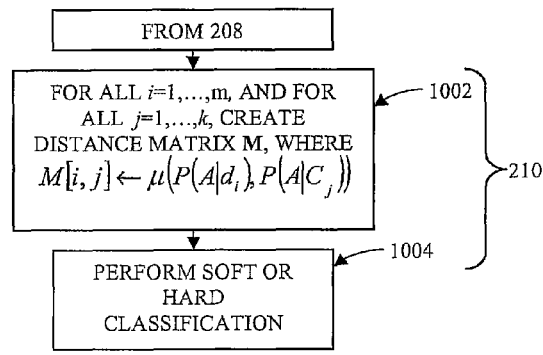
FIG. 10 is a schematic diagram, illustrating an exemplary process of classifying data, in accordance with embodiments of the present invention.

100681 An exemplary process of categorizing records is described in greater detail with respect to FIG. 10. Referring to FIG. 10, an exemplary classification process involves creating a distance matrix M is created (1002) and performing either a soft or a hard classification process (1004). In one embodiment, the distance matrix M created at 1002 is an i×j matrix (where $i=1, \ldots, m$ and $j=1, \ldots, k$) listing all possible record/folder combinations. In another embodiment, each entry within the distance matrix M identifies a degree of similarity between a record identified in the $i^{th}$ row of the distance matrix M and a folder identified in the $j^{th}$ column of the distance matrix M.

Where folders and records are internally represented under the 1-norm representation schema, the degree of similarity can be represented by an entropic distance metric, t that characterizes a measure of the divergence (or proximity) between every possible record/folder combination present within the distance matrix M. In one embodiment, values for the entropic distance metric, μ, can be obtained according to the Jensen-Shannon (JS) divergence measure—a well known divergence measure that is built upon the Kullback-Leibler (KL) divergence measure. The JS measure inherits all the properties of KL divergence but does not suffer from the singularity problem. Moreover, the JS divergence can be generalized to more than two distributions and argument distributions can be weighted.

For any combination of an arbitrary record $d_i \in D$ and an arbitrary folder $C_j \in \Gamma$, with respective likelihood probabilities $\pi_i$ and $\pi_j$, let the likelihood probability that the record $d_i$ will be classified into folder $C_j$ (i.e., the union of record $d_i$ with folder $C_j$, represented as $C_u$), be $\pi_u = \pi_i + \pi_j$. The probability mass function representation of the resultant classification over the attribute space can be defined as the weighted mean of the probability functions of $d_i$ with folder $C_j$):

$$P(A|C_u) = \frac{\pi_i}{\pi_u} P(A|d_i) + \frac{\pi_j}{\pi_u} P(A|C_j).$$

and the JS-divergence between $d_i$ and $C_j$ is:

$$JS(P(A|d_i) \| P(A|C_j)) = \frac{\pi_i}{\pi_u} KL\left(\frac{P(A|d_i)\|}{P(A|C_u)}\right) + \frac{\pi_j}{\pi_u} KL\left(\frac{P(A|C_j)\|}{P(A|C_u)}\right),$$

Using this JS-divergence function, the entropic distance metric, t can be represented as a linear function of the JS-divergence between the $i^{th}$ record $d_i$ and the $j^{th}$ folder $C_j$:

$$\mu(P(A|d_i), P(A|C_j)) = (\pi_i + \pi_j) JS(P(A|d_i) \| P(A|C_j)).$$

Thus, for each $i=1, \ldots, m$, and for each $j=1, \ldots, k$, the entry $M[i,j]$ denotes $\mu(P(A|d_i), P(A|C_j))$, i.e., the entropic distance between the $i^{th}$ record $d_i$ and the $j^{th}$ folder $C_j$.

As discussed above, the 1-norm representation schema transforms each record and cluster into a set of d locally normalized probability distributions, one normalized probability distribution for each of the d attributes. Therefore, the entropic proximity or divergence measure between two records or clusters is a weighted summation of the entropic similarity or dissimilarity measure between respective intra-attribute probability functions. Assuming that the weight distribution over the attributes $A_1, A_2, \ldots, A_d$ is $\{\omega_1, \omega_2, \ldots, \omega_d\}$, each individual weight can be used to regulate the contribution of an entropic proximity or divergence measure specific to a particular attribute. In one embodiment, the entropic divergence measure is obtained as follows:

$$M[i,j] \leftarrow \sum_{q=1}^{d} \exp(-\lambda \omega_q) \mu(P(A_q|d_i), P(A_q|C_j)),$$

and the entropic proximity measure as follows:

$$M[i,j] \leftarrow \sum_{q=1}^{d} \omega_q \exp(-\lambda \mu(P(A_q|d_i), P(A_q|C_j))),$$

where λ is a gradient-controlling parameter of the entropic measure μ.

In many embodiments, less weight may be given to the divergence between two probability components if the corresponding attribute is of a higher weight while more weight may be given the proximity between two probability components if the corresponding attribute is of a higher weight.

After creating the distance matrix M at 1002, the records $d_1, d_2, \ldots, d_m$ can be classified at 1004. According to embodiments of the present invention, records can be classified at 1004 according to either a soft classification process or a hard classification process. Records are soft-classified using the folder set $\Gamma$ by creating a m×k probability matrix P, where m is the number of records in the dataset D, and k is the number of folders in the folder set $\Gamma$ created at 206. For each $i=1, \ldots, m$, and for each $j=1, \ldots, k$, the entry $P[i,j]$ denotes $P(C_j|d_i)$ (i.e., the likelihood probability of occurrence of the j-th folder, given the i-th record). In one embodiment, $P(C_j|d_i)$ can be calculated as follows:

$$P(C_j \mid d_i) = \left( \sum_{u=1}^{k} M[i, u] - M[i, j] \right) \bigg/ \sum_{u=1}^{k} M[i, u],$$

where the constraints over this likelihood probability distribution are that (i) $0 \leq P(C_j \mid d_i) \leq 1$, and (ii) for every $$d_i \in D, \sum_{j=1}^{k} P(C_j \mid d_i) = 1.$$

According to the soft classification process, there is a one-to-many-onto mapping between the dataset D and the folder set $\Gamma$. As a result, every record $d_i$ can belong to more than one folder and the dataset D is fuzzily partitioned using the k folders of the folder set $\Gamma$, wherein each folder in the folder set $\Gamma$ contains a ranked-ordered list of records, in order of highest entropic similarity to lowest entropic similarity.

Records are hard-classified using the folder set $\Gamma$ by creating an m×k binary matrix B, where m is the number of records in the dataset D, and k is the number of folders in the folder set $\Gamma$ created at 206. For each i=1, . . . , m, and for each j= 1, . . . , k, the entry B[i,j] is 1 if $$C_j = \arg \max_{u \in (1, \ldots, k)} P(C_u \mid d_i)$$

and the entry B[i,j] is 0 if $$C_j \neq \arg \max_{u \in (1, \ldots, k)} P(C_u \mid d_i).$$

According to the hard classification process described above, there is a one-to-one-onto mapping between the dataset D and the folder set $\Gamma$. As a result, every record $d_i$ completely belongs to one and only one folder $C_j$: $P(C_j \mid d_i) \in \{0,1\}$ and the dataset D is crisply partitioned into k subsets—corresponding to the k folders.

Where the records are classified using the aforementioned hard classification process, an embodiment of the present invention provides for the detection and separation of outlier records (i.e., records within the dataset D that are not adequately described by the folder set $\Gamma$). In one embodiment, outlier records can be detected within the binary matrix B by identifying, for all i=1, . . . ,m, folders in j, such that B[i,j]=1. The record/folder combination at B[i,j] is then identified within the distance matrix M. If the entry at M[i,j] is greater than a threshold value $\epsilon$, then the record $d_i$ is determined to be an outlier and subsequently classified into a new folder (e.g., as similarly described above with respect to 710 and 712). As used herein, the threshold value $\epsilon$ represents the effective field-radius of the folders within the folder set $\Gamma$. Accordingly, if the entry at M[i,j] is greater than $\epsilon$, the record $d_i$ is too dissimilar from folder $C_j$ to be considered as properly classifiable by folder $C_j$. In one embodiment, the threshold value $\epsilon$ can be set by the user.

As described above, each folder $C_j$ is identified by the vector-space representation of the $i^{th}$ exemplar $P_i$ it was initiated with. In another embodiment, the centroid of each folder is identified as the vector representing the last record to be classified in that folder; thus, the centroid of a folder can be constantly updated to reflect the current status of the dataset D. For the sake of ease of exposition, no formal distinction will be drawn between a folder and the underlying vector identifying the folder.

As above discussed, one embodiment of the present invention allows folders to be added to, and deleted from the folder set $\Gamma$. An exemplary process by which new folders can be added is described below with reference to FIG. 11 and an exemplary process by which existing folders can be deleted is described below with reference to FIG. 12. In one embodiment, the processes described with respect to FIGS. 11 and 12 can be implemented after records have been classified into the folder set $\Gamma$ (e.g., after 610). In another embodiment, the processes described with respect to FIGS. 11 and 12 can be implemented independently of one another or can be implemented sequentially, e.g., to delete existing folders from the folder set after adding new folders, or vice-versa.

Figure 11:
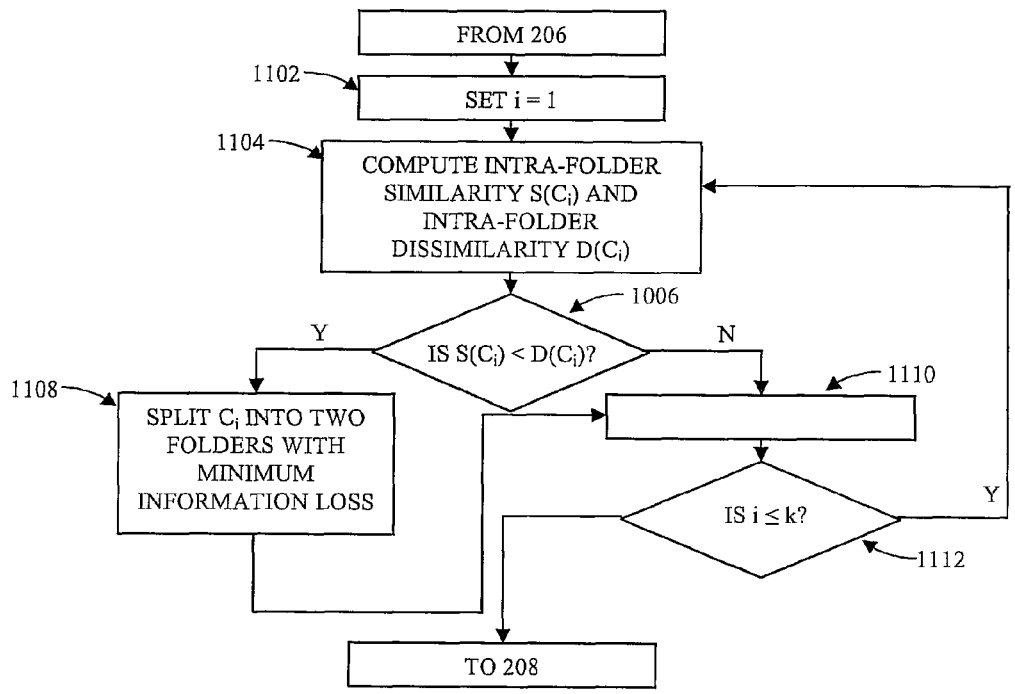
FIG. 11 is a schematic diagram, illustrating an exemplary process of adding new folders to a folder set, in accordance with embodiments of the present invention.

Referring to FIG. 11, new folders can be added to the folder set $\Gamma$ by, for example, setting a folder counter variable, i, equal to 1 (1102), computing the similarity of, and dissimilarity between records within the $i^{th}$ folder $C_i$ (i.e., the intra-folder similarity and dissimilarity of $C_i$) (1104), and determining whether the intra-folder similarity of $C_i$ is less than the intra-folder similarity thereof (1106). In one embodiment, the intra-folder similarity and dissimilarity can be calculated as described above with respect to 722.

If, as a result of 1106, it is determined that the intra-folder similarity is less the intra-folder dissimilarity, $C_i$ is split into a plurality of folders at 1108 and the process flow proceeds to 1110 where the folder counter variable i is incremented by one. In one embodiment, $C_i$ is split into two folders so as to maximize the information gain, i.e., minimize entropy, within each child folder. Accordingly, records contained within the same folder are more similar to each other than to records contained within different folders.

If, as a result of 1106, it is determined that the intra-folder similarity is not less the intra-folder dissimilarity, the process flow proceeds directly to 1110 where the folder counter variable i is incremented by one. Subsequently, at 1112, it is determined whether the incremented folder counter variable i exceeds the total number of folders within the folder set $\Gamma$. If, as a result of 1112, it is determined that incremented folder counter variable i does not exceed the total number of folders within the folder set $\Gamma$, the process flow is directed back to 1104. Otherwise, the process flow is directed to 208.

Figure 12:
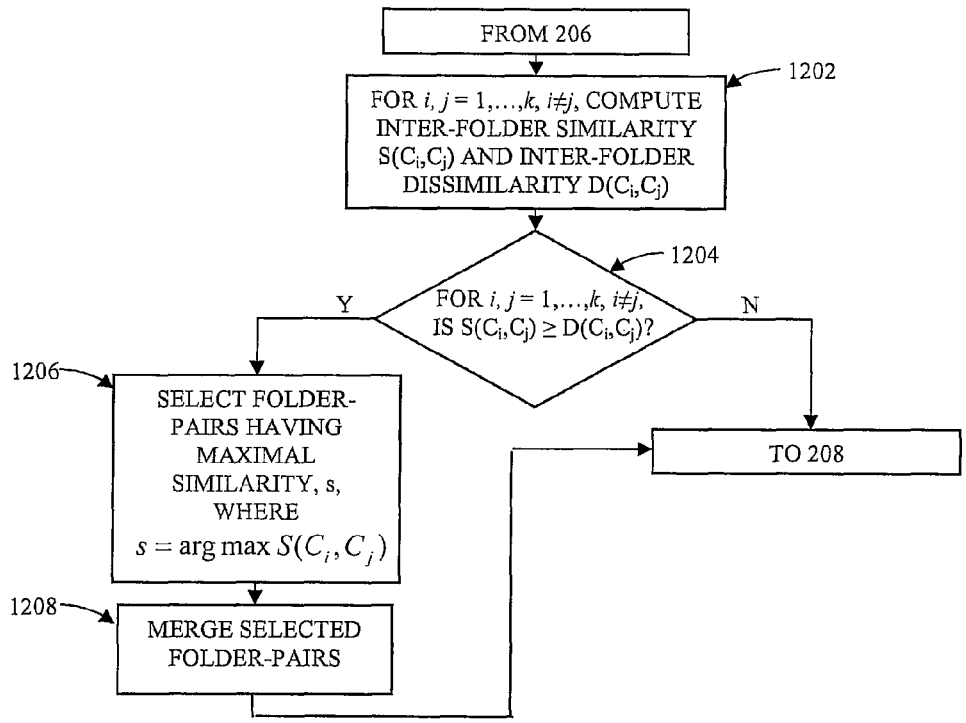
FIG. 12 is a schematic diagram, illustrating an exemplary process of deleting folders from a folder set, in accordance with embodiments of the present invention.

Referring to FIG. 12, existing folders can be deleted from the folder set $\Gamma$ by, for example, computing, for all unique combinations of folders $C_i$ and $C_j$ within the folder set $\Gamma$ (where i and j=1, . . . , k, i≠j), the similarity between $C_i$ and $C_j$, i.e., the inter-folder similarity, $S(C_i, C_j)$, and the dissimilarity between $C_i$ and $C_j$, i.e., the inter-folder dissimilarity, $D(C_i, C_j)$ (1202), and determining whether there is any folder combination $(C_i, C_j)$ for which the inter-folder similarity is greater than or equal to the inter-folder dissimilarity (1204). In one embodiment, the intra-folder similarity and dissimilarity can be calculated as described above with respect to 722.

If, as a result of 1204, it is determined that there is some combination of folders $(C_i, C_j)$ for which the inter-folder similarity is greater than or equal to the inter-folder dissimilarity, then the process flow continues to 1206 where all folder pairs having a maximal inter-folder similarity are identified and are selected to be subsequently merged together at 1208. Following 1208 (or following 1204, if it is determined that there are no combination of folders $(C_i, C_j)$ for which the inter-folder similarity is greater than or equal to the inter-folder dissimilarity), and the process flow is directed to 208.

In one embodiment of the present invention, the contents of each folder of the folder set $\Gamma$ can be viewed by a user. In another embodiment, the system 100 enables a user to view records within a folder of the folder set Γ and provide negative user feedback in a process referred to herein as "dynamic belief revision". Negative user feedback can be provided by identifying which records viewed within a folder are improperly classified within the folder. An exemplary dynamic belief revision process will now be described below with reference to FIG. 13.

Figure 13:
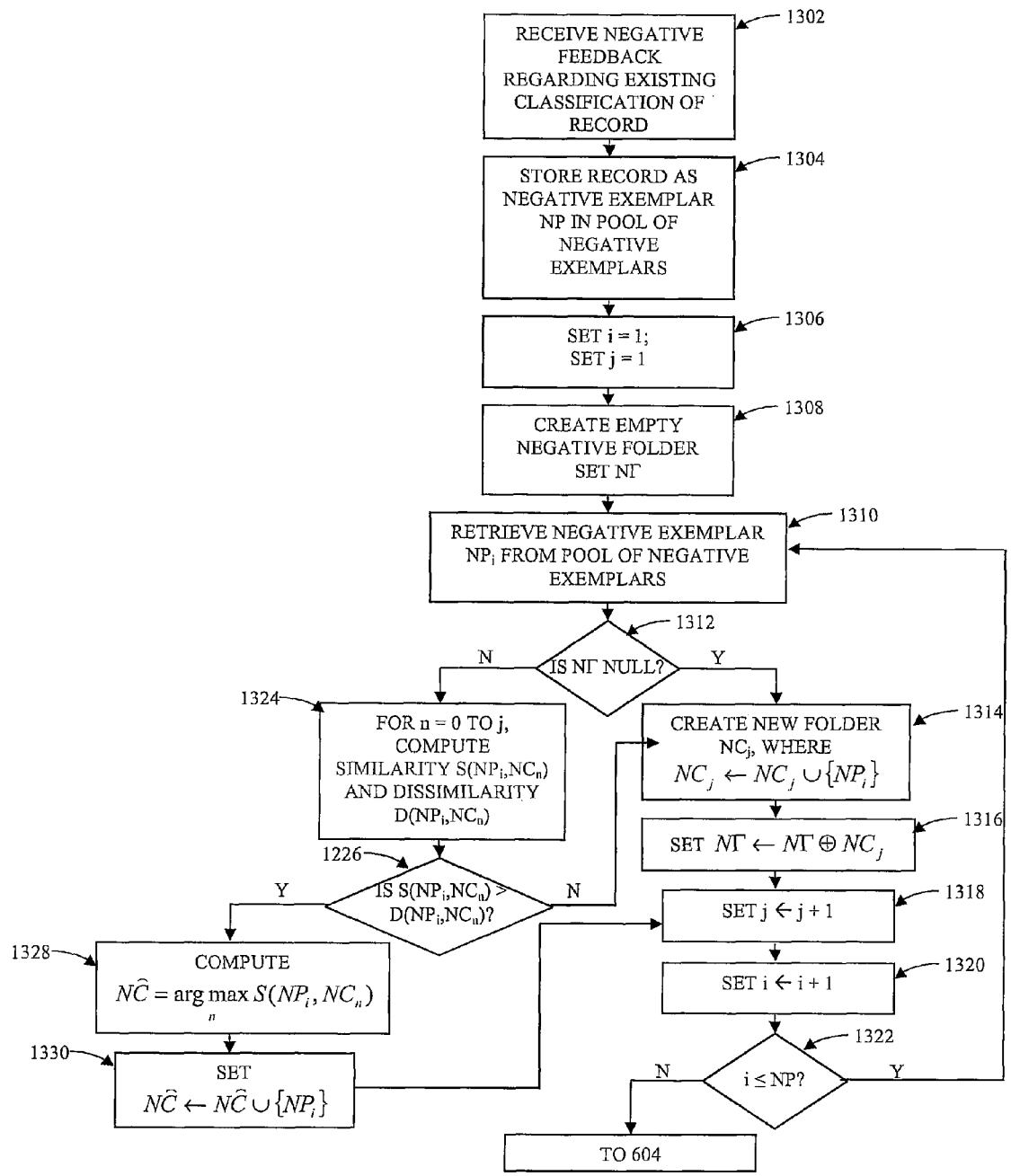
FIG. 13 is a schematic diagram, illustrating an exemplary process of modifying folder content based on user feedback, in accordance with embodiments of the present invention.

Referring to FIG. 13, and as mentioned above, the dynamic belief revision process is automatically initiated upon receipt of negative user feedback (1302). In one embodiment, the negative user feedback is provided by a user and identifies records which the user believes are not classified in the correct folder. For example, the negative user feedback can be received by a user that assigned a binary rating to a record, marking it as an "unlikely" record as currently classified in a folder. After receiving the negative user feedback, the record for which the negative user feedback was received is treated as a negative exemplar NP and stored in a pool of negative exemplars (1304).

The remainder of the dynamic belief revision process is similar to process described above with respect to FIG. 7. For example, negative exemplar and folder counter variables, i and j, respectively, are set to 1 (1306), an empty negative exemplar folder set NΓ is created (1308), the $i^{th}$ negative exemplar $NP_i$ ($0<i\leq NP$) is retrieved from a pool of negative exemplars obtained as a result of the negative user feedback provided by the user (1310), and it is determined whether the negative folder set NΓ contains any folders (1312). In one embodiment, each negative exemplar is represented as a vector having the same dimension as each record pre-preprocessed at 204, wherein values assigned to each component of the exemplar vector represent the presence of a term within the particular negative exemplar.

If, as a result of 1312 it is determined that the negative folder set Γ does not contain any folders, then a new folder $NC_j$, containing the $i^{th}$ negative exemplar $NP_i$, is created (1314), the $j^{th}$ folder $NC_j$ is mapped into the negative folder set NΓ (1316), the folder counter variable j is incremented by one (1318), the negative exemplar counter variable i is incremented by one (1320), and, at 1322, it is determined whether the incremented negative exemplar counter variable i exceeds the number of negative exemplars in the pool of negative exemplars.

If, as a result of 1322, it is determined that the incremented negative exemplar counter variable i does not exceed the number of negative exemplars in the pool of negative exemplars, then the process flow is directed back to 1310. Otherwise, the process flow proceeds from 1322 to 604.

If, as a result of 1312, it is determined that the negative folder set Γ is not empty (i.e., because the folder set Γ contains j negative folders $NC_1, \ldots NC_j$), then the process flow continues to 1324 where the similarity and the dissimilarity between the $i^{th}$ negative exemplar $NP_i$ and each negative folder n within the negative folder set NΓ are calculated and, subsequently, to 1326 where it is determined whether the similarity between the $i^{th}$ negative exemplar $NP_i$ and any negative folder within the negative folder set NΓ is greater than the dissimilarity thereof.

If, as a result of 1326, it is determined that the similarity between the $i^{th}$ negative exemplar $NP_i$ and a negative folder within the negative folder set NΓ is less than the dissimilarity thereof, then the process flow proceeds to 1314. If, as a result of 1326, it is determined that the similarity between the $i^{th}$ negative exemplar $NP_i$ and a negative folder within the negative folder set NΓ is greater than the dissimilarity thereof, then the process flow proceeds to 1328 where a negative folder $N\hat{C}$ within the negative folder set NΓ is identified to be most similar to the $i^{th}$ negative exemplar $NP_i$. The $i^{th}$ negative exemplar $NP_i$ is then merged into the identified negative folder $N\hat{C}$ (1330) and the process flow continues to 1318.

In one embodiment, the negative folders within the negative folder set NΓ are hidden from the user. In another embodiment, records can be classified into negative folders of the negative folder set NΓ at 210 as similarly discussed above with respect to the classification of records using folders of the folder set Γ. In yet another embodiment, negative folders can be added to, and deleted from the negative folder set Γ as similarly discussed above with respect to FIGS. 11 and 12. In a further embodiment, the negative folders can be hidden from (i.e., not displayed to) the user.

As discussed above, the numerous embodiments discussed above provide a folder-based classification system and method. Categorical data that has been classified using a folder set Γ can be used in various ways. For example, a user can select a record (e.g., provided as document describing a television program) via a system input device. Based on the record selected, the system 100 can identify other records that are classified within the same folder and automatically record television programs that are classified within that folder, allow a user to select television programs that are classified within that folder to be recorded, allow a user to "channel surf" between television programs represented by records that are classified within that folder, create new folders containing records that are similar to selected record, and the like, or combinations thereof.

While the invention herein disclosed has been described by means of specific embodiments, examples and applications thereof, numerous modifications and variations could be made thereto by those skilled in the art without departing from the scope of the invention set forth in the claims.

INDUSTRIAL APPLICABILITY

Embodiments of the present invention generally industrially apply to methods and systems that are adapted to classify data. More specifically, embodiments of the present invention industrially apply to folder-based methods and systems that are adapted to classify data.

What is claimed:

1. A computerized method of representing a dataset with a taxonomy, comprising:
   obtaining a dataset containing a plurality of records;
   initializing a folder-set containing a plurality of folders;
   assigning labels to folders within the folder set;
   classifying the plurality of records into the plurality of folders according to a predetermined entropic similarity condition; and
   merging a plurality of folders when it is determined that a similarity between the plurality of folders is greater than a dissimilarity between the folders;
   wherein the computerized method of representing a dataset with a taxonomy occurs within a processor, the processor comprising at least one hardware platform.

2. The method of claim 1, wherein initializing comprises receiving a user-defined folder set.

3. The method of claim 1, wherein initializing comprises:
   obtaining an exemplar, the exemplar establishing a classification of a record into a folder; and
   automatically creating a folder-set formed of visible folders using the obtained exemplar.

4. The method of claim 1, wherein the exemplar is a previously classified record establishing a classification of a record into a folder.

5. The method of claim 4, wherein the exemplar is a user-defined exemplar establishing a user-defined classification of a record into a folder.

6. The method of claim 1, wherein classifying comprises:
characterizing combinations of records and folders according to a predetermined entropic similarity metric; and
classifying each record into a folder based on a value characterizing the combination of each record and folder.

7. The method of claim 6, wherein classifying comprises classifying each record into a plurality of folders based on values characterizing the combination of each record and folder.

8. The method of claim 1, further comprising splitting a folder within the folder set into a plurality of folders when it is determined that an intra-folder similarity of the folder is less than an intra-folder dissimilarity of the folder.

9. The method of claim 1, wherein the processor further comprises at least one element selected from a group consisting essentially of an electronic computing device, a calculator, a display device, a computer system, an information storage device, a transmission device, and at least one operating system.

10. The method of claim 1, further comprising:
receiving feedback from the user, the feedback establishing that a record should not be classified within a folder;
creating a hidden folder using the feedback received; and
classifying the plurality of records into the hidden folder according to the predetermined entropic similarity condition.

11. A computer program product, comprising a computer usable medium having computer readable code embodied therein for causing a processor to effect:
obtaining a dataset containing a plurality of records;
initializing a folder-set containing a plurality of folders;
assigning labels to folders within the folder set;
classifying the plurality of records into the plurality of folders according to a predetermined entropic similarity condition; and
merging a plurality of folders when it is determined that a similarity between the plurality of folders is greater than a dissimilarity between the folders,
wherein the computer program product, comprising the computer usable medium, is operable within a processor, the processor comprising at least one hardware platform.

12. The computer program product of claim 11, further comprising a computer usable medium having computer readable code embodied therein for causing the processor to effect initializing by receiving a user-defined folder set.

13. The computer program product of claim 11, further comprising a computer usable medium having computer readable code embodied therein for causing the processor to effect initializing by:
obtaining at least one exemplar, the at least one exemplar establishing a classification of a record into a folder; and
automatically creating a folder-set formed of visible folders using the at least one received exemplar.

14. The computer program product of claim 11, wherein the exemplar is a previously classified record establishing a classification of a record into a folder.

15. The computer program product of claim 14, wherein the exemplar is a user-defined exemplar establishing a user-defined classification of a record into a folder.

16. The computer program product of claim 11, further comprising a computer usable medium having computer readable code embodied therein for causing the processor to effect classifying by:
characterizing combinations of records and folders according to a predetermined entropic similarity metric; and
classifying each record into a folder based on a value characterizing the combination of each record and folder.

17. The computer program product of claim 16, further comprising a computer usable medium having computer readable code embodied therein for causing the processor to effect classifying by classifying each record into a plurality of folders based on values characterizing the combination of each record and folder.

18. The computer program product of claim 11, further comprising a computer usable medium having computer readable code embodied therein for causing the processor to effect splitting a folder within the folder set into a plurality of folders when it is determined that an intra-folder similarity of the folder is less than an intra-folder dissimilarity of the folder.

19. The computer program product of claim 11, the processor further comprises at least one element selected from a group consisting essentially of an electronic computing device, a calculator, a display device, a computer system, an information storage device, a transmission device, and at least one operating system.

20. The computer program product of claim 11, wherein the computer usable medium having computer readable code embodied therein further causes a processor to effect:
receiving feedback from the user, the feedback establishing that a record should not be classified within a folder;
creating at least one hidden folder using the feedback received; and
classifying the plurality of records into the at least one folder according to the predetermined entropic similarity condition.

* * * * *

UNITED STATES PATENT AND TRADEMARK OFFICE
CERTIFICATE OF CORRECTION

| | |
|---|---|
| PATENT NO. | : 7,937,352 B2 |
| APPLICATION NO. | : 12/620499 |
| DATED | : May 3, 2011 |
| INVENTOR(S) | : Chiranjit Acharya |

It is certified that error appears in the above-identified patent and that said Letters Patent is hereby corrected as shown below:

On the TITLE PAGE:
Under OTHER PUBLICATIONS, line 8, delete "Hierachical" and insert --Hierarchical--.

Signed and Sealed this
Second Day of August, 2011

David J. Kappos
*Director of the United States Patent and Trademark Office*